July 14, 1953

L. ROBIN 2,645,319

FREE WHEEL MECHANISM

Filed April 30, 1951

INVENTOR
LÉO ROBIN,

BY Robert B. ———  ATTORNEY

Patented July 14, 1953

2,645,319

UNITED STATES PATENT OFFICE 2,645,319

FREE WHEEL MECHANISM

Leo Robin, Ville-d'Avray, France

Application April 30, 1951, Serial No. 223,682
In France May 3, 1950

3 Claims. (Cl. 192—41)

The present invention relates to free wheel mechanisms, that is to say mechanisms including two coaxial elements, a driving one and a driven one, interconnected in such manner that they are automatically coupled together in rotation for a given direction of rotation of the driving element and are free with respect to each other when said driving element rotates in the opposed direction.

My invention is concerned with free wheel mechanisms in which the driven element includes a rotary drum and the driving element has an eccentrically positioned point thereof connected with a cross bar which, when a relative movement of the two elements tends to occur in the driving direction, is applied at its ends against the cylindrical wall of said drum, in such manner as to be wedged against said drum wall and therefore to couple the driving and driven elements with each other. The connection between said driving element and said cross bar may be constituted either by a mere link or by a plurality of elements a portion of which may act as wedging means the effects of which are added to that of said cross bar.

A free wheel of this kind was already described in U. S. patent to Robin, No. 2,501,408, March 21, 1950, for "Freewheel Mechanism."

It was found that, in such a free wheel mechanism, the centrifugal force which acts upon the cross bar and the parts interposed between said bar and the driving element has a tendency, when the mechanism is free wheeling, to cause said cross bar and possibly some intermediate parts interposed between it and the driving element to rub against the drum wall, which both causes premature wear and tear of the pieces by friction and may interfere with a satisfactory free wheeling operation of the mechanism.

The object of my invention is to remedy this drawback.

It consists chiefly in providing a counterweight carried by a support pivoted on the driving element and in connecting said support with said cross bar through means enabling the support and the cross bar to have relative angular movements with respect to each other, this counterweight being arranged to balance at least a portion of the torque produced with reference to the common axis of the driving and driven elements by the resultant of the centrifugal forces to which are subjected the cross bar and the connecting means interposed between said bar and the driving element.

Figure 1:
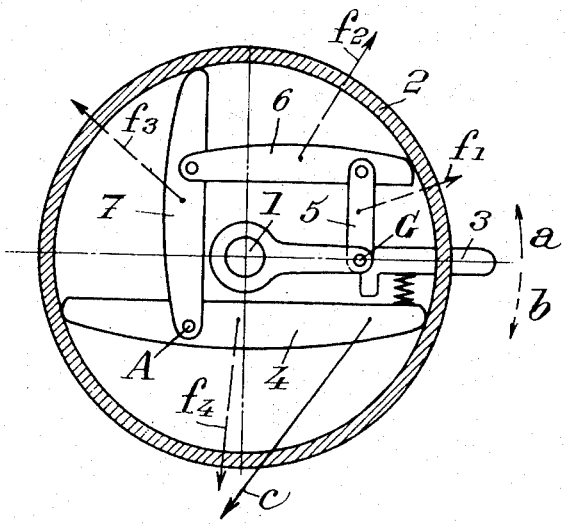

A preferred embodiment of my invention will be hereinafter described with reference to the accompanying drawings, given merely by way of example and in which:

Fig. 1 of these drawings diagrammatically shows a free wheel mechanism of the type with which the invention is concerned but which does not incorporate the characteristic feature of my invention.

Figure 2:
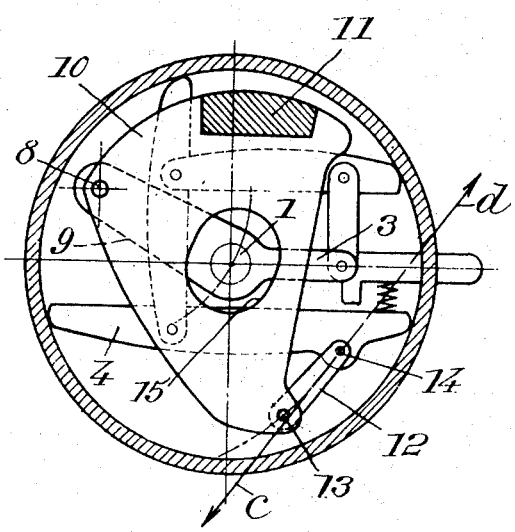

Fig. 2 is a similar view of a free wheel mechanism analogous to that shown by Fig. 1 but made according to my invention.

The free wheel mechanism shown by the drawings serves to couple, in one direction of rotation, a driven element rigid with a shaft 1 and in the form of a hollow drum 2 with a driving element including an arm 3 and rotating coaxially with shaft 1.

I provide, inside drum 2 and along a chord thereof a cross bar 4 adapted to be applied against the cylindrical inner wall of drum 2 at two points located at a distance from each other smaller than the inner diameter of the drum. Between driving element 3 and cross bar 4, there is a connecting system fixed on the one hand to the driving element at a point G eccentric with respect to the axis of shaft 1 and, on the other hand, to cross bar 4 at a point A determined in such manner as to obtain wedging of the ends of bar 4 against the cylindrical inner wall of drum 2 when arm 3 is moved in a direction, for instance that indicated by arrow $a$. Advantageously, this connecting system includes a link 5 and two levers 6 and 7, these levers being pivoted each at one of its ends, respectively to lever 7 and to bar 4, whereas their other ends are applied against the inner wall of drum 2, when arm 3 is moved in the direction of arrow $a$, whereby the effect of their wedging against the inner wall of drum 2 is added to the wedging effect of the ends of cross bar 4 against the same inner wall.

Owing to these wedging effects, I obtain an immediate drive of drum 2 by the driving element when the arm 3 thereof is turned relatively to drum 2 in the direction indicated by arrow $a$, whereas drum 2 is not driven when the relative movement of arm 3 is in the opposed direction (arrow $b$).

In a device such as above described and shown by Fig. 1, the centrifugal forces which act upon the various elements 4, 5, 6 and 7 when arm 3 rotated in the direction indicated by arrow $b$ have a tendency to cause the ends of elements 4, 6 and 7 to rub against the inner wall of the drum, which in the long run causes a wear and tear of this wall and of said ends.

If it is endeavoured to balance by one another the centrifugal forces acting on these elements (these forces being diagrammatically indicated by the dotted lines arrows $f_1, f_2, f_3, f_4$) merely by means of a suitable choice and distribution of their masses, it is found that there always remains a resultant which does not pass through the axis of shaft 1 and which has, in the example shown by Fig. 1, the direction indicated approximately by arrow $c$, this resultant therefore giving rise to a torque with respect to the axis of shaft 1. In order to avoid any detrimental friction of the ends of elements 4, 6 and 7 on the inner wall of drum 2, it remains necessary to balance this torque.

According to my invention, to create a suitable compensating torque, I pivot at 8, on an extension of driving element 3, a support 10 carrying a counterweight 11 and I connect this support to cross bar 4 through a link 12 or other means making it possible for the support and the cross bar to move angularly with respect to each other.

Advantageously, the location of pivot axis 8 with respect to the hinge 13 through which the counterweight effect is transmitted to cross bar 4 is chosen so that the resultant $c$ to be balanced is disposed substantially along a tangent to the circle having its center at 8 and a radius equal to the distance between 8 and 13.

If, as indicated by Fig. 2, a link 12 connects support 10 to cross bar 4, both of the ends 13 and 14 of this link are located, at least approximately, on resultant $c$.

By giving this counterweight 11 a suitable mass, cross bar 4 is thus subjected to a force $d$ equal and opposed to force $c$, whereby the two forces $d$ and $c$ balance each other and the torque about the axis of shaft 1 disappears. There remains only centrifugal forces which pass through the axis of the mechanism and cannot apply the ends of elements 4, 6 and 7 against the inner wall of drum 2.

Support 10 may of course be given any suitable shape. For instance, it may be constituted by two parallel sheet metal discs between which counterweight 11 is located. In order to avoid interference with shaft 1, a hole 15 is provided in this support.

In what precedes, it was supposed that the force $d$ applied at 12 by the effect of the counterweight is equal to force $c$, but of course in some cases the balancing force $d$ may be smaller or greater than resultant $c$.

The position of pivot points 8, 13 and 14 may be established in every case by calculation and graphical methods, so that the force $d$ resulting from the action of counterweight 11 is applied at 12 in a direction opposed to that of resultant $c$ and in the desired ratio thereto.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A free wheel mechanism which comprises, in combination, a driving element, a driven element coaxial with said driving element and including a rotary drum, a cross bar of a length smaller than that of the inner diameter of said drum bearing against the inner wall thereof, connecting means between said bar and a point of said driving element eccentric with respect to the axis thereof for wedging said bar against said drum inner wall when said driving element is rotating in one direction and leaving said bar free to slide on said drum when said driving element is rotating in the opposed direction, a support pivoted to said driving element about an axis parallel to the common axis of said driving and driven elements, interconnecting means between said support and said bar to permit relative rotational displacements thereof, and a counterweight secured to said support to balance at least partly the torque resulting from the combined actions of the centrifugal forces exerted upon said bar and said first mentioned connecting means.

2. A free wheel mechanism which comprises, in combination, a driving element, a driven element coaxial with said driving element and including a rotary drum, a cross bar of a length smaller than that of the inner diameter of said drum bearing against the inner wall thereof, connecting means between said bar and a point of said driving element eccentric with respect to the axis thereof for wedging said bar against said drum inner wall when said driving element is rotating in one direction and leaving said bar free to slide on said drum when said driving element is rotating in the opposed direction, a support pivoted to said driving element about an axis parallel to the common axis of said driving and driven elements, an interconnecting link pivoted at its ends to said support and said bar respectively about axes parallel to said pivot axis, and a counterweight secured to said support to balance at least partly the torque resulting from the combined actions of the centrifugal forces exerted upon said bar and said first mentioned connecting means.

3. A free wheel mechanism according to claim 2 in which said support is constituted by two parallel discs at right angles to said axes and said counterweight is located between said discs.

LEO ROBIN.

References Cited in the file of this patent

UNITED STATES PATENTS

| Number | Name | Date |
|---|---|---|
| 981,295 | Marfield | Jan. 10, 1911 |
| 1,167,117 | Sanford | Jan. 4, 1916 |
| 2,197,522 | Ferguson et al. | Apr. 16, 1940 |
| 2,501,408 | Robin | Mar. 21, 1950 |